US007757073B2

(12) United States Patent
Huang et al.

(10) Patent No.: US 7,757,073 B2
(45) Date of Patent: Jul. 13, 2010

(54) SYSTEM CONFIGURATION DATA SHARING BETWEEN MULTIPLE INTEGRATED CIRCUITS

(75) Inventors: Robert Huang, Fremont, CA (US);
Bruce R Intihar, San Jose, CA (US);
Prakash G Apte, Westford, MA (US);
Thomas H Teng, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 737 days.

(21) Appl. No.: 11/552,846

(22) Filed: Oct. 25, 2006

(65) Prior Publication Data
US 2008/0104378 A1 May 1, 2008

(51) Int. Cl.
*G06F 9/24* (2006.01)
*G06F 15/177* (2006.01)
(52) U.S. Cl. ............................. 713/1; 713/100; 710/104
(58) Field of Classification Search ...................... 713/1, 713/100; 710/104
See application file for complete search history.

(56) References Cited
U.S. PATENT DOCUMENTS
6,349,378 B1 * 2/2002 Duranton et al. .............. 712/28

7,111,103 B2 * 9/2006 Wang et al. .................. 710/306

* cited by examiner

*Primary Examiner*—Thuan N Du
(74) *Attorney, Agent, or Firm*—Townsend and Townsend and Crew LLP

(57) ABSTRACT

System configuration data is transferred from a master integrated circuit to a shadow integrated circuit in a computer system before the system is initialized. The configuration data is initially stored in configuration registers in the master integrated circuit. The configuration data may include values that are programmed via hardware (e.g., strapped pin values) or software (e.g., default or overridden values). A CPU accesses the configuration data in the configuration registers through a host module of the shadow integrated circuit. A copy of the configuration data is transferred to shadow registers in the shadow integrated circuit. After system initialization, the CPU may execute software to read configuration values directly from the configuration registers on the master integrated circuit. The CPU may also execute a write operation on the configuration data in both the configuration registers and the shadow registers such that the configuration settings are consistent across the system.

20 Claims, 5 Drawing Sheets

SYSTEM CONFIGURATION DATA SHARING BETWEEN MULTIPLE INTEGRATED CIRCUITS

BACKGROUND OF THE INVENTION

The present invention relates in general to the configuration of a computer system, and in particular to sharing configuration data between multiple integrated circuits.

A computer system may be configured for initialization by storing configuration data in a register of an integrated circuit included in the system. Values for the configuration data may be established using both hardware and software methods. An example method for hardware configuration includes programming values for individual pins on an integrated circuit. The programmed values may be set to a threshold voltage or ground depending on the configuration setting. An example method for software configuration includes writing values directly to the register of the integrated circuit. The configuration values are distributed to the appropriate components within the computer system via a data bus. Some configuration values cannot be changed after initialization because the correct value must be set before initialization; otherwise the data bus may not be operable.

A computer system may require the configuration information to be shared across multiple integrated circuits or devices within the system. The configuration data may be shared by duplicating registers and connecting programming inputs across the system. System software ensures that the configuration data is consistent by writing to all of the registers individually. Likewise, the system hardware ensures that all of the programmed pin information is correctly loaded during initialization into the respective subsystems. However, individual subsystems may become inconsistent with other subsystems during operation because hardware initialization of programmed pins and software overrides are separately executed for each subsystem. Furthermore, connecting all pins that are programmed for the same configuration setting is laborious as computer systems become more complex with a large number of integrated circuits each having a large number of pins.

BRIEF SUMMARY OF THE INVENTION

Embodiments of the present invention provide for the sharing of system configuration data between multiple integrated circuits. The configuration data is initially stored in configuration registers in a master integrated circuit. A central processing unit (CPU) accesses the configuration data in the configuration registers through a host module of a shadow integrated circuit. A copy of the configuration data is loaded in shadow registers in the shadow integrated circuit before initialization of the computer system.

After system initialization, the CPU may execute software to read configuration values directly from the configuration registers on the master integrated circuit. The CPU may also execute a write operation on the configuration data in both the configuration registers and the shadow registers such that the configuration settings are consistent across the system. Thus, any updates or overrides to the configuration data may be easily implemented after system initialization such that a consistent and uniform view of configuration data across all system devices eliminates errors caused by inconsistent configuration values.

According to one aspect of the present invention, a system for sharing configuration data includes a master integrated circuit coupled to a shadow integrated circuit. The master integrated circuit includes a configuration register that stores configuration data for controlling initial configuration of a computer system. The shadow integrated circuit includes a shadow register. A copy of the configuration data is transferred from the configuration register to the shadow register before the computer system is initialized.

In some embodiments, the configuration data may include a value that is defined by programming a pin on the master integrated circuit. The pin may be associated with a strap that is a pull-up resistor or a pull-down resistor. The configuration data may include a default value. The configuration data may also include a value that overrides a value previously stored in the configuration register when a new value for the configuration data is generated.

In some embodiments, the shadow integrated circuit includes a host module for accessing the configuration data in the configuration register and transferring the configuration data to the shadow register. The shadow integrated circuit may be coupled to the master integrated circuit through a priority request interleaving (PRI) bus.

In some embodiments, the system includes a CPU that is coupled to the shadow integrated circuit through a peripheral component interconnect (PCI) bus. The CPU may execute a read operation on the configuration register. The CPU may execute a write operation on both the shadow register and the configuration register.

According to another aspect of the invention, a method for transferring configuration data from a master integrated circuit to a shadow integrated circuit includes accessing the configuration data from a configuration register in the master integration circuit, and transferring a copy of the configuration data to a shadow register in the shadow integration circuit. The configuration data controls initial configuration of a computer system. The configuration data is transferred to the shadow register before the computer system is initialized.

In some embodiments, a value for the configuration data may be defined by programming a pin on the master integrated circuit. A value for the configuration data may be set to a default value. A value for the configuration data may be updated when a new value for the configuration data is generated. A read operation may be executed on the configuration register. A write operation may be executed on both the configuration register and on the shadow register.

According to yet another aspect of the invention, a method for transmitting signals across a data bus between a master integrated circuit and a shadow integrated circuit includes transmitting a configuration data access signal across the data bus from the shadow integrated circuit to the master integrated circuit, and transmitting a copy of the configuration data across the data bus from the master integrated circuit to the shadow integrated circuit. The configuration data controls initial configuration of a computer system. The configuration data is transferred to the shadow register before the computer system is initialized. In some embodiments, the data bus is a PRI bus.

The following detailed description together with the accompanying drawings will provide a better understanding of the nature and advantages of the present invention.

DETAILED DESCRIPTION OF THE INVENTION

Embodiments of the present invention provide for the sharing of system configuration data between multiple integrated circuits. The configuration data is initially stored in configuration registers in a master integrated circuit. A CPU accesses the configuration data in the configuration registers through a host module of a shadow integrated circuit. A copy of the configuration data is loaded in shadow registers in the shadow integrated circuit before initialization of the computer system.

After system initialization, the CPU may execute software to read configuration values directly from the configuration registers on the master integrated circuit. The CPU may also execute a write operation on the configuration data in both the configuration registers and the shadow registers such that the configuration settings are consistent across the system. Thus, any updates or overrides to the configuration data may be easily implemented after system initialization such that a consistent and uniform view of configuration data across all system devices eliminates errors caused by inconsistent configuration values.

System Overview

Figure 1:
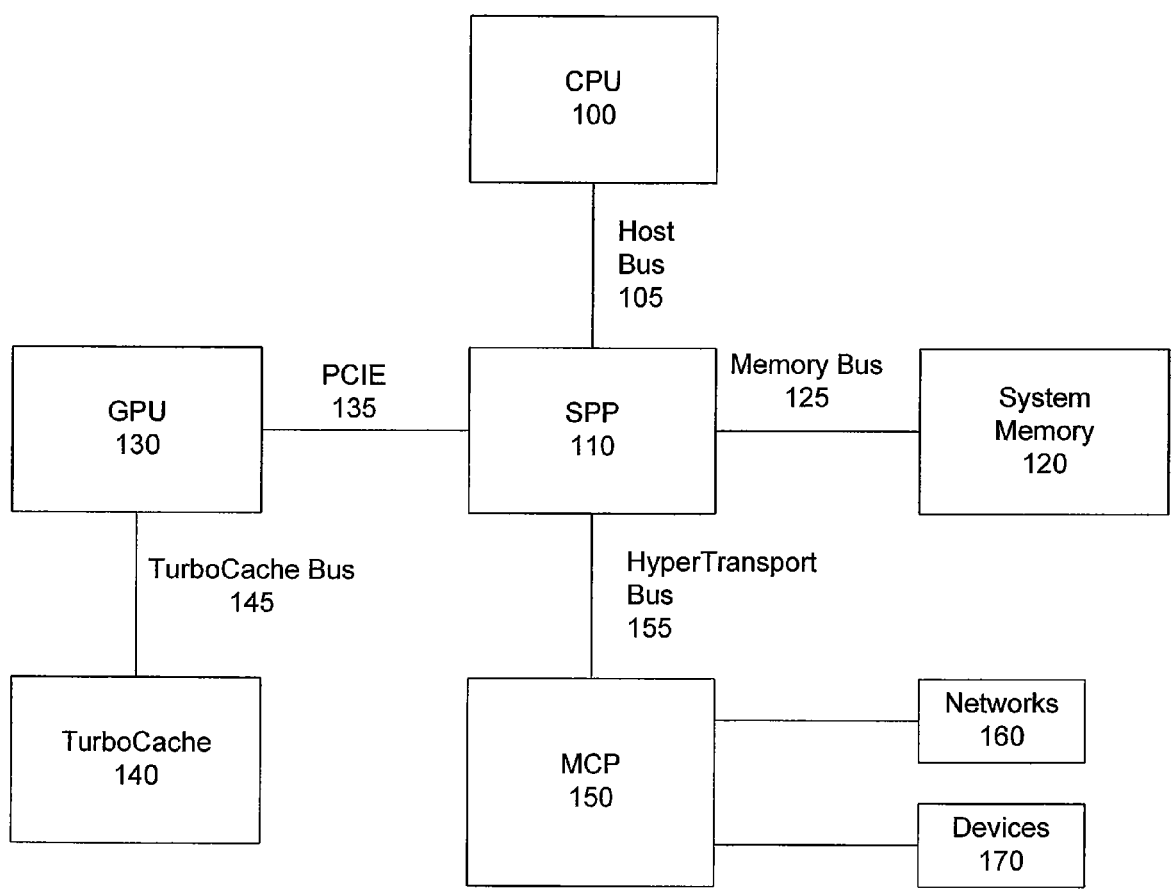
FIG. 1 is a block diagram of a computer system that is improved by the incorporation of an embodiment of the present invention.

FIG. 1 is a block diagram of a computing system that is improved by incorporating an embodiment of the present invention. This block diagram includes a CPU or host processor 100, system platform processor (SPP) 110, system memory 120, graphics processing unit (GPU) 130, TurboCache™ memory 140, media communications processor (MCP) 150, networks 160, and internal and peripheral devices 170. This figure, as with the other included figures, is shown for illustrative purposes only, and does not limit either the possible embodiments of the present invention or the claims.

The CPU 100 connects to the SPP 110 over the host bus 105. The SPP 110 is in communication with the graphics processing unit 130 over a PCIE connection 135. The SPP 110 reads and writes data to and from the system memory 120 over the memory bus 125.

The MCP 150 communicates with the SPP 110 via a high-speed connection such as a HyperTransport bus 155, and connects network 160 and internal and peripheral devices 170 to the remainder of the computer system. The graphics processing unit 130 receives data over the PCIE connection 135 and generates graphic and video images for display over a monitor or other display device (not shown). The graphics processing unit stores pixel and other graphics data in the system memory 120. Some of this data is cached in the TurboCache™ memory 140.

The CPU 100 may be a processor, such as those manufactured by Intel Corporation, Advanced Micro Devices, or other supplier, and are well-known by those skilled in the art. The SPP 110 and MCP 150 are commonly referred to as a chipset, each being a chipset integrated circuit. These devices may alternately be Northbridge and Southbridge devices. The system memory 120 is often a number of dynamic random access memory devices arranged in a number of the dual in-line memory modules (DIMMs). The graphics processing unit 130, SPP 110, and MCP 150 are preferably manufactured by NVIDIA Corporation of Santa Clara, Calif.

The graphics processing unit 130 and TurboCache™ memory 140 may be located on a graphics card, while the CPU 100, system platform processor 110, system memory 120, and media communications processor 150 may be located on a computer system motherboard. The graphics card is typically a data printed circuit board with the graphics processing unit 130 and TurboCache™ memory 140 attached. The printed circuit board typically includes a connector, for example a PCI connector, also attached to the printed circuit board, that fits into a PCIE slot included on the motherboard.

A computer system, such as the illustrated computer system, may include more than one GPU 130. Additionally, each of these graphics processing units may be located on a separate graphics card. Two or more of these graphics cards may be joined together by a jumper or other connection. One such technology, the pioneering SLI™, has been developed by NVIDIA Corporation of Santa Clara, Calif. In other embodiments of the present invention, one or more GPUs may be located on one or more graphics cards, while one or more others are located on the motherboard.

While this embodiment provides a specific type computer system that may be improved by the incorporation of an embodiment of the present invention, other types of electronic or computer systems may also be improved. For example, video and other game systems, navigation, set-top boxes, pachinko machines, and other types of systems may be improved by the incorporation of embodiments of the present invention.

Also, while these types of computer systems, and the other electronic systems described herein, are presently commonplace, other types of computer and other electronic systems are currently being developed, and others will be developed in the future. It is expected that many of these may also be improved by the incorporation of embodiments of the present invention. Accordingly, the specific examples listed are explanatory in nature and do not limit either the possible embodiments of the present invention or the claims.

Figure 2:
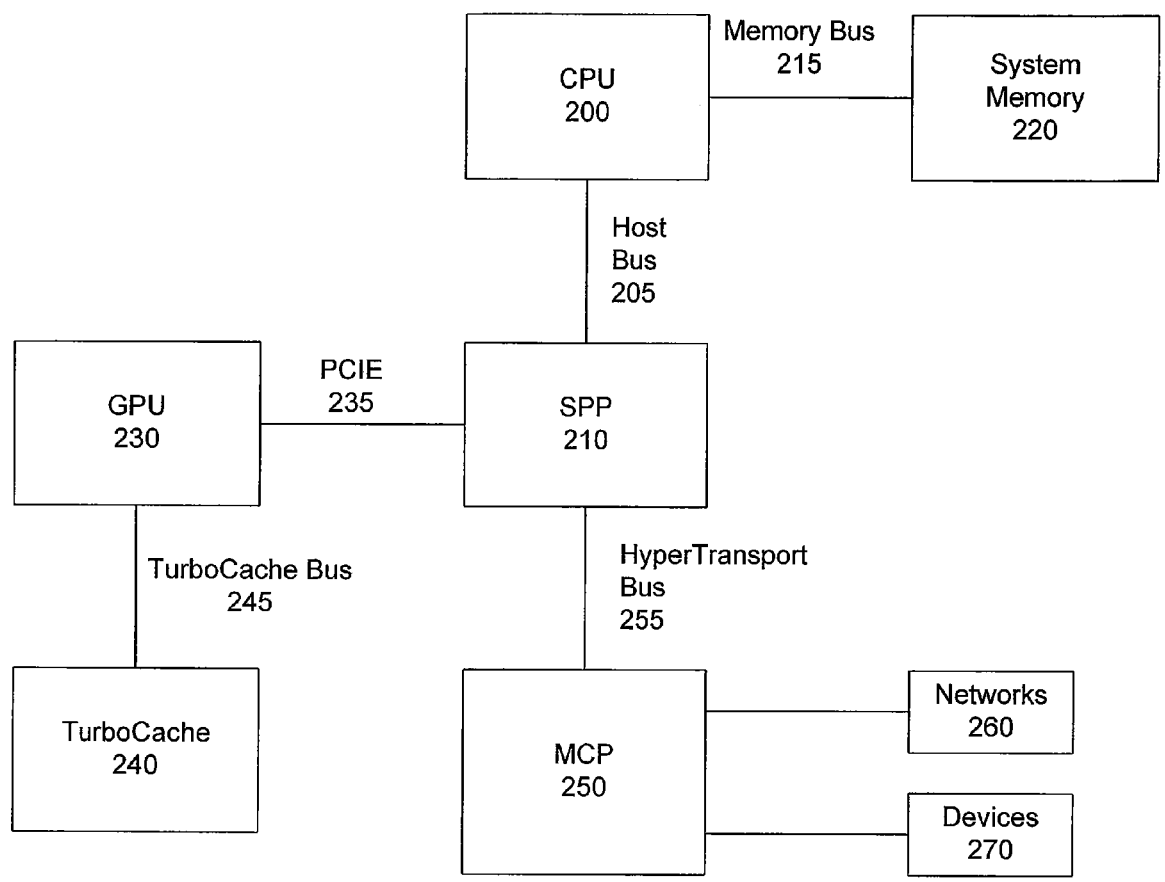
FIG. 2 is a block diagram of another computing system that is improved by incorporating an embodiment of the present invention.

FIG. 2 is a block diagram of another computing system that is improved by incorporating an embodiment of the present invention. This block diagram includes a CPU or host processor 200, SPP 210, system memory 220, graphics processing unit 230, TurboCache™ memory 240, MCP 250, networks 260, and internal and peripheral devices 270.

The CPU 200 connects to the SPP 210 over the host bus 205. The SPP 210 reads and writes data to and from the system memory 220 over the memory bus 225. The graphics processor 230 communicates with the SPP 210 using the PCIE connection 235 and provides graphic and video images for display over a monitor or other display device (not shown). The graphics processor 230 caches data in the TurboCache™ memory 240 over the TurboCache™ memory bus 245. The SPP 210 and MCP 250 communicate over a high-speed bus such as a HyperTransport bus 255. The MCP 250 connects networks 260 and internal and peripheral devices 270 to the remainder of the computer system. Examples of networks 260 include Ethernet, USB, and wireless networks. Examples of devices 270 include hard disk drives, optical drives, printers, and other devices.

The CPU 200 may be a processor, such as those manufactured by Intel Corporation, Advanced Micro Devices, or other supplier, and are well-known by those skilled in the art. The IGP 210 and MCP 250 are commonly referred to as a chipset and may alternately be Northbridge and Southbridge circuits. The SPP 210, GPU 230, and MCP 250 are preferably devices manufactured by NVIDIA Corporation of Santa Clara, Calif.

Again, the high bandwidth provided by the PCIE connection allows the GPUs to store pixel and other graphics data in the system memory. In order to reduce the traffic on the PCIE connection, the GPU caches data in the TurboCache™ memory. To the extent that this caching can be made more efficient, the TurboCache™ memory can be made smaller, traffic on the PCIE connection can be reduced, or a combination of these may be achieved.

Accordingly, an embodiment of the present invention provides for the sharing of configuration data between multiple integrated circuits in a computer system.

System Configuration Data Sharing Between Multiple Integrated Circuits

Figure 3:
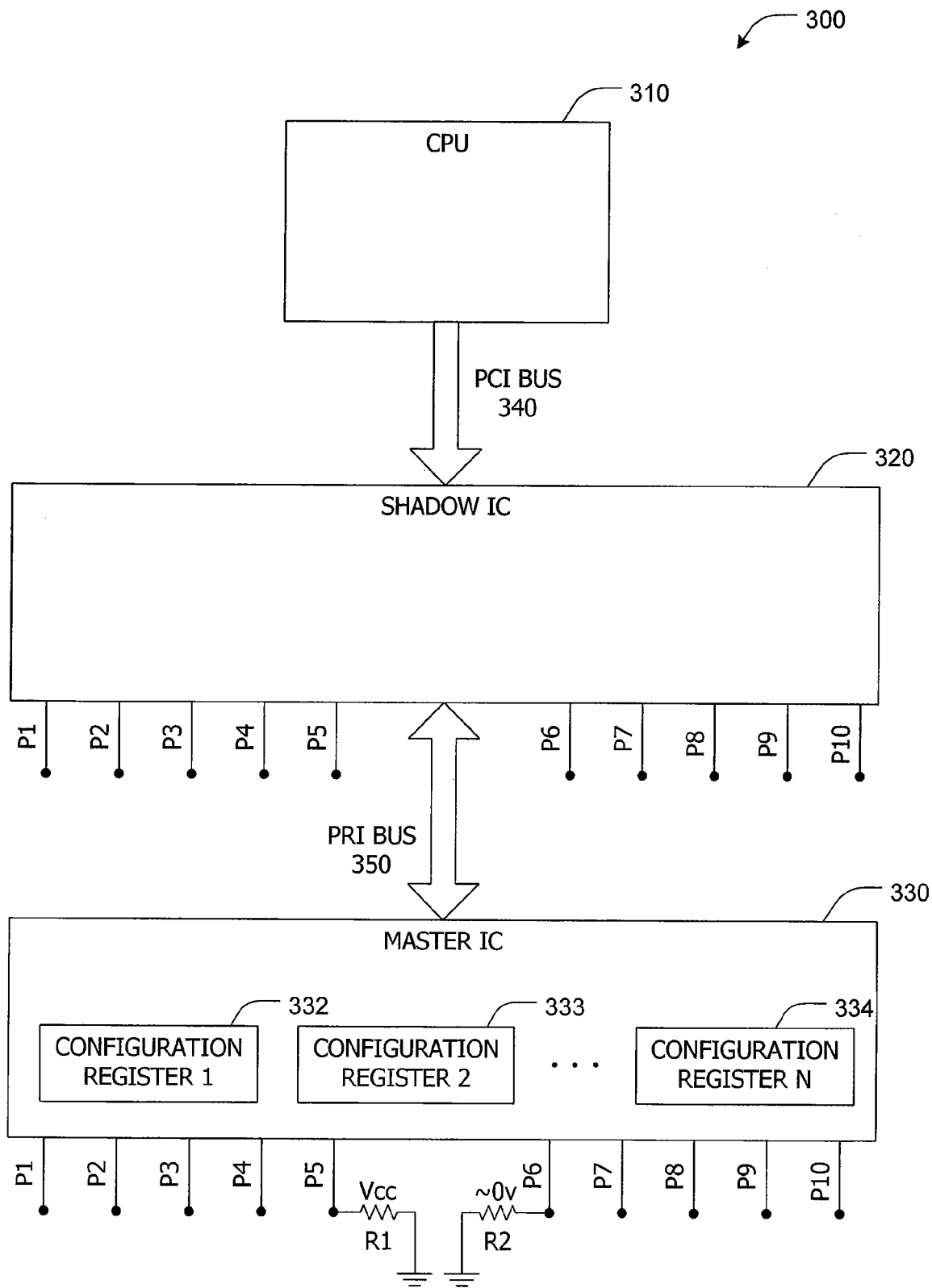
FIG. 3 is a block diagram of a system for sharing configuration data across multiple integrated circuits according to an embodiment of the present invention.

FIG. 3 is a block diagram of a system for sharing configuration data across multiple integrated circuits according to an embodiment of the present invention. The system 300 includes a CPU 310, a shadow integrated circuit 320 and a master integrated circuit 330. The shadow integrated circuit 320 and the master integrated circuit 330 may be any type of integrated circuit included in a computer system. The CPU 310 is coupled to the shadow integrated circuit 320 through a peripheral component interconnect (PCI) bus 340. The master integrated circuit 330 communicates with the shadow integrated circuit 320 through a priority request interleaving (PRI) bus 350. The CPU 310 does not directly communicate with the master integrated circuit 330. From the perspective of the CPU 310, the master integrated circuit 330 and the shadow integrated circuit 320 are linked together because an address space set in the shadow integrated circuit 320 points to the configuration registers 332, 333, 334 in the master integrated circuit 330.

Each integrated circuit 320, 330 may include a number of pins (P1-P10). Some pins may be hardware programmed individually to control initial system configuration. Such a programmed pin is associated with a "strap". In one embodiment, a strap refers to a pull-up or pull-down resistor (R1, R2) that is physically mounted on a motherboard and coupled to a pin of an integrated circuit. For example, resistor R1 may be given a high resistance value (e.g., 10KΩ) to set pin P5 at a threshold voltage (Vcc) in accordance with the corresponding configuration parameter. Likewise, resistor R2 may be given a low resistance value (e.g., 10Ω) to set pin P6 at ground (~0 volts) in accordance with the corresponding configuration parameter.

The master integrated circuit 330 may include one or more configuration registers 332, 333, 334. The configuration registers 332, 333, 334 include information about the configuration settings associated with the master integrated circuit 330. The configuration settings may include both the hardware programmed values at the pins and the software programmed configuration values. The software programmed values may be set at a default value or may override a previously defined setting. Example configuration settings stored in the configuration registers 332, 333, 334 include buffer size, multiple GPU support settings, television mode support settings, PCIE settings, base address registers (BAR), and the like.

Figure 4:
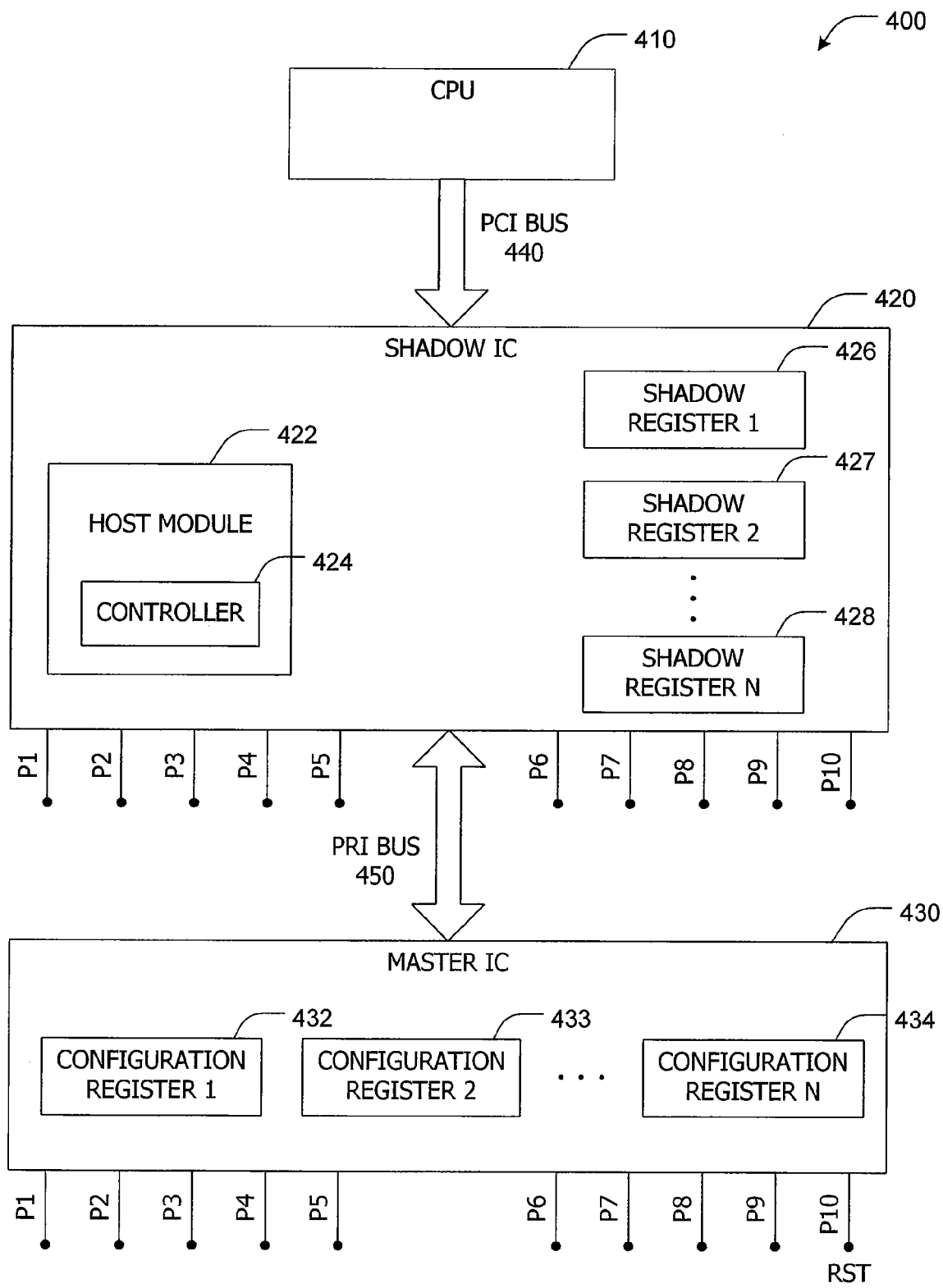
FIG. 4 is a block diagram of a system for sharing configuration data across multiple integrated circuits according to an embodiment of the present invention.

FIG. 4 is a block diagram of a system for sharing configuration data across multiple integrated circuits according to an embodiment of the present invention. The system 400 includes a CPU 410, a shadow integrated circuit 420, and a master integrated circuit 430. The shadow integrated circuit 420 and the master integrated circuit 430 may be any type of integrated circuit included in a computer system. The CPU 410 is coupled to the shadow integrated circuit 420 through a PCI bus 440. The master integrated circuit 430 communicates with the shadow integrated circuit 420 through a PRI bus 450. The shadow integrated circuit 420 includes a host module 422. The host module 422 includes a controller 424. The master integrated circuit 430 may include one or more configuration registers 432, 433, 434.

Just prior to initial system configuration, the CPU 410 accesses the host module 422 to read the configuration data in the configuration registers 432, 433, 434 of the master integrated circuit 430. The configuration data includes both hardware programmed values and software programmed values. The host module 422 communicates with the configuration registers 432, 433, 434 via the PRI bus 450. A copy of the configuration data in the configuration registers 432, 433, 434 is distributed from the master integrated circuit 430 to the shadow integrated circuit 420 via the PRI bus 450. In one embodiment, a reset may be activated at the master integrated circuit 430. For example, a reset (RST) may be activated at pin P10. When the reset is asserted, the configuration values are loaded from the master integrated circuit 430 to the shadow integrated circuit 420 via the PRI bus 450.

The configuration data is distributed by copying the configuration data in the configuration registers 432, 433, 434 and loading the copy of the configuration data to the host module 422 of the shadow integrated circuit 420. The controller 424 in the host module 422 reads the configuration data and copies the values into corresponding shadow registers 426, 427, 428 in the shadow integrated circuit 420. The PRI bus 450 controls the configuration registers 432, 433, 434 and the shadow registers 426, 427, 428 such that the configuration values are copied and loaded in the shadow registers 426, 427, 428 before initialization of the computer system.

In one embodiment, the configuration data in the master integrated circuit 430 is distributed to other configuration registers within the master integrated circuit 430. In another embodiment, the configuration data in the master integrated circuit 430 is distributed to multiple integrated circuits in the computer system simultaneously. In yet another embodiment, not all of the configuration values are distributed to all of the integrated circuits within the computer system. Only the configuration settings that are used by an integrated circuit are distributed to that integrated circuit. In other words, each shadow register of an integrated circuit stores only the configuration data associated with that particular integrated circuit. For example, a television mode support setting is only useful to a configuration register in an integrated circuit associated with the display of graphics. Thus, the television mode support setting is only distributed to a graphic display integrated circuit.

After completion of the system initialization phase, the CPU 410 may execute software to read configuration values directly from the configuration registers 432, 433, 434 on the master integrated circuit 430. The CPU 410 is unaware of the presence of the shadow registers 426, 427, 428 because an address space set in the host module 422 points only to the configuration registers 432, 433, 434. The configuration values are read from the master integrated circuit 430 because a change in system design after system initialization may result in a configuration data conflict between values in one of the configuration registers 432, 433, 434 and a corresponding shadow register 426, 427, 428. The conflict is overcome by reading the configuration value directly from the master integrated circuit 430 because the values in the configuration registers 432, 433, 434 are the most reliable.

The system software may require the CPU 410 to execute a write operation on the configuration data. The write operation may be initiated by a configuration data update or override. The write operation is executed on both the configuration registers 432, 433, 434 and the shadow registers 426 427, 428. The write operation is executed on all associated shadow registers such that the new configuration values are available across the entire computer system. Thus, the configuration settings are consistent across the computer system thereby obviating the need for multiple software configuration write operations.

Figure 5:
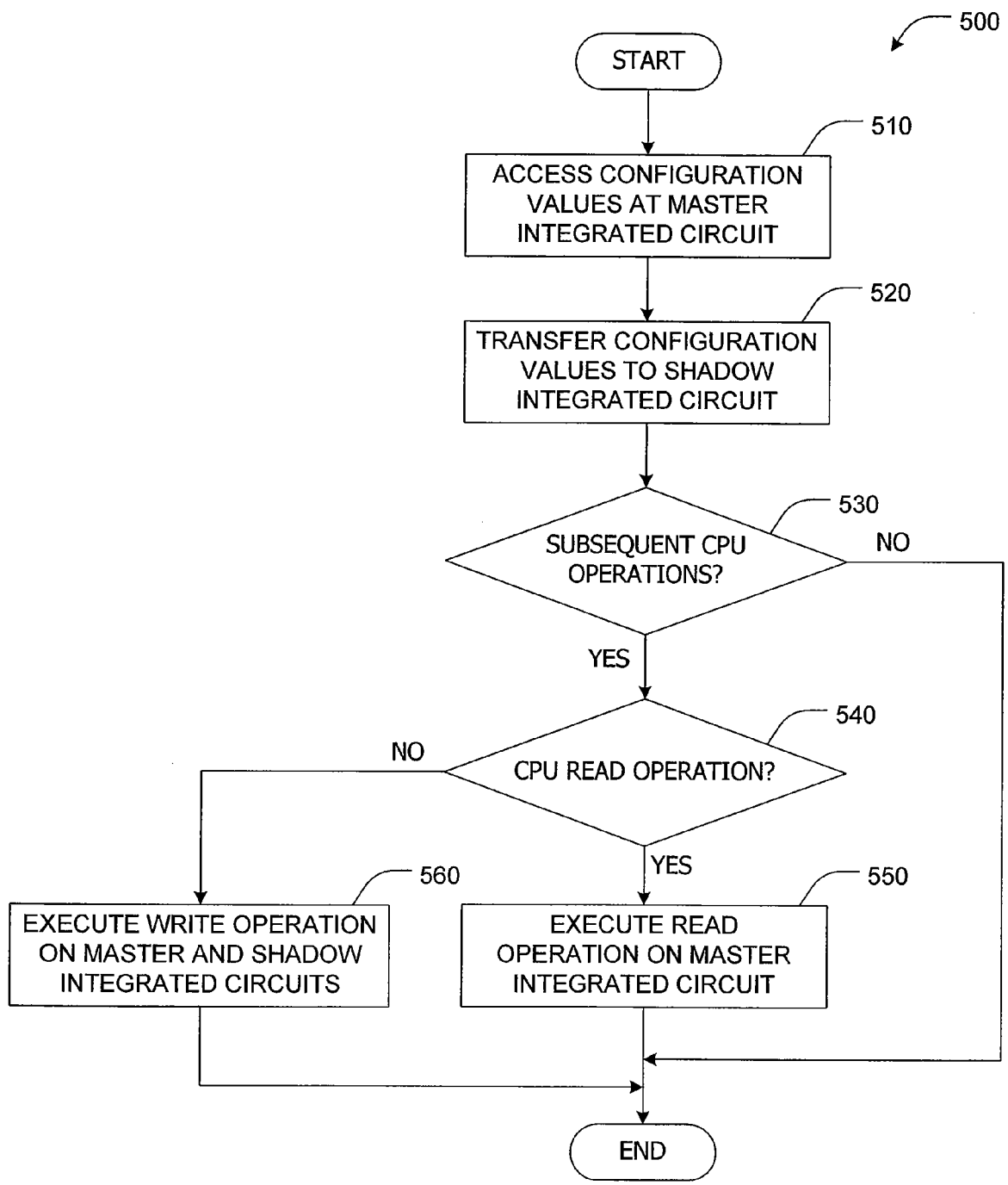
FIG. 5 is a flow diagram of a process for sharing system configuration data across multiple integrated circuits according to an embodiment of the present invention.

FIG. 5 is a flow diagram of a process for sharing system configuration data between multiple integrated circuits. The process 500 begins at a start operation where a CPU is coupled to a shadow integrated circuit by a PCI bus, and a master integrated circuit is coupled to the shadow integrated circuit by a PRI bus. The shadow integrated circuit and the master integrated circuit may be any type of integrated circuit included in a computer system. The master integrated circuit includes configuration registers for storing configuration data associated with the master integrated circuit. The configuration data may be hardware or software programmed to control initial system configuration. For example, at least some pins associated with the master integrated circuit may be individually hardware programmed. In another example, system configuration settings are established by executing software at the CPU. The software programmed settings may establish default values or may override previously defined settings. The shadow integrated circuit includes a host module, and the host module includes a controller.

Moving to operation 510, just prior to initial system configuration, the CPU accesses the host module of the shadow integrated circuit to determine the configuration values stored in the master integrated circuit. The CPU does not directly communicate with the master integrated circuit. From the perspective of the CPU, the master integrated circuit and the shadow integrated circuit are linked together because an address space set in the shadow integrated circuit points only to the configuration registers in the master integrated circuit. The host module requests the configuration data from the configuration registers in the master integrated circuit via the PRI bus.

Continuing to operation 520, a copy of the configuration data in the configuration registers is transferred to the shadow integrated circuit via the PRI bus. The copy of the configuration data is loaded to the host module of the shadow integrated circuit. The controller in the host module transfers the configuration data values to the corresponding shadow registers in the shadow integrated circuit before initialization of the computer system.

Transitioning to decision operation 530, a determination is made whether subsequent CPU operations are executed on the configuration data. If no further CPU operations are executed on the configuration data after initialization of the computer system, the process terminates at an end block. If further CPU operations are executed on the configuration data, processing proceeds to decision operation 540 where a determination is made whether the CPU operation is a read operation. If the CPU operation is a read operation, processing proceeds to operation 550. If the CPU operation is not a read operation, the CPU operation would be a write operation and processing proceeds to decision operation 560.

Proceeding to operation 550, the CPU executes software to read configuration values directly from the configuration registers of the master integrated circuit. The CPU is unaware of the presence of the shadow registers because an address space set in the host module of the shadow integrated circuit points only to the configuration registers in the master integrated circuit. The configuration values are read from the master integrated circuit to overcome any conflicts between values in the shadow registers and the configuration registers caused by a change in configuration data after system initialization. Processing then terminates at the end operation.

Moving to operation 560, the CPU executes software to perform a write operation on the configuration data. The write operation may be initiated by a configuration value update or override. The write operation is executed on both the configuration registers. The write operation is also executed on all associated shadow registers such that the new configuration values are available across the entire computer system. Thus, the configuration settings are consistent across the entire computer system thereby obviating the need for multiple software configuration write operations. Processing then terminates at the end operation.

While the invention has been described with respect to specific embodiments, one skilled in the art will recognize that numerous modifications are possible. In one embodiment, the configuration data may be shared within one integrated circuit such that subset copies of the configuration data are distributed to different components of the integrated circuit. For example, one integrated circuit may contain a master portion and a shadow portion such that the configuration data is transferred from the master portion to the shadow portion. The shadow portion could be divided into smaller regions such that each shadow region is proximate an area of the integrated circuit that utilizes the configuration data stored in the shadow region.

Although the invention has been described with respect to specific embodiments, it will be appreciated that the invention is intended to cover all modifications and equivalents within the scope of the following claims.

What is claimed is:

1. A system for sharing configuration data comprising:
 a master integrated circuit comprising a configuration register, wherein the configuration register stores configuration data for controlling initial configuration of a computer system; and
 a shadow integrated circuit coupled to the master integrated circuit, the shadow integrated circuit comprising
  a shadow register; and
  a host module that is arranged to:
   access the configuration data in the configuration register; and
   transfer the configuration data to the shadow register
  wherein a copy of the configuration data is transferred from the configuration register to the shadow register before the computer system is initialized.

2. The system of claim 1, wherein the configuration data comprises a value that is defined by programming a pin on the master integrated circuit.

3. The system of claim 2, further comprising a strap associated with the pin, wherein the strap is associated with one of: a pull-up resistor and a pull-down resistor.

4. The system of claim 1, wherein the configuration data comprises a default value.

5. The system of claim 1, wherein the configuration data comprises a value that overrides a value previously stored in the configuration register when a new value for the configuration data is generated.

6. The system of claim 1, wherein the shadow integrated circuit includes an address that points to the configuration register in the master integrated circuit.

7. The system of claim 1, wherein the master integrated circuit is coupled to the shadow integrated circuit through a priority request interleaving (PRI) bus.

8. The system of claim 1, further comprising a central processing unit coupled to the shadow integrated circuit, wherein the central processing unit accesses the host module to initiate access and transfer of the configuration data to the shadow register.

9. The system of claim 8, wherein the central processing unit is coupled to the shadow integrated circuit through a peripheral component interconnect (PCI) bus.

10. The system of claim 8, wherein the central processing unit is arranged to execute a read operation on the configuration register.

11. The system of claim 8, wherein the central processing unit is arranged to execute a write operation on the configuration register and on the shadow register.

12. The system of claim 1, further comprising a central processing unit coupled to the shadow integrated circuit, wherein the central processing unit executes software to read the configuration data directly from the configuration register in the master integrated circuit, and wherein the master integrated circuit further comprises a reset pin for activating the initialization of the computer system.

13. A method for sharing configuration data in a computer system, the method comprising:
   accessing the configuration data from a configuration register in a master integrated circuit, wherein the configuration data controls initial configuration of the computer system;
   transferring a copy of the configuration data from the configuration register to a shadow register in a shadow integrated circuit before the computer system is initialized;
   linking an address in an address space set in the shadow integrated circuit to an address for the configuration register; and
   performing, with a central processing unit coupled to the shadow integrated circuit, a read operation on the configuration data in the configuration register by accessing the address in the shadow integrated circuit.

14. The method of claim 13, further comprising defining a value for the configuration data by programming a pin on the master integrated circuit.

15. The method of claim 13, further comprising setting a value for the configuration data to a default value.

16. The method of claim 13, further comprising updating a value for the configuration data when a new value for the configuration data is generated.

17. The method of claim 13, further comprising performing, with the central processing unit, a write operation on the configuration register and on the shadow register by accessing the address in the shadow integrated circuit.

18. A method for sharing configuration data in a computer system, the method comprising:
   loading the configuration data into a configuration register in a master integrated circuit, wherein the configuration data controls initial configuration of the computer system;
   transmitting a configuration data access signal across a data bus from a shadow integrated circuit to the master integrated circuit; and
   transmitting a copy of the configuration data across the data bus from the master integrated circuit to a shadow register in the shadow integrated circuit before the computer system is initialized.

19. The method of claim 18, wherein the data bus is a priority request interleaving (PRI) bus.

20. The method of claim 18, further comprising:
   performing, with a central processing unit coupled to the shadow integrated circuit, a read operation of the configuration data in the master integrated circuit by accessing an address in the shadow integrated circuit; and
   performing, with the central processing unit, a write operation on the configuration register in the master integrated circuit by accessing the address in the shadow integrated circuit.

* * * * *